United States Patent
Chou et al.

(10) Patent No.: US 7,394,237 B2
(45) Date of Patent: Jul. 1, 2008

(54) MAXIUM POWER POINT TRACKING METHOD AND TRACKING DEVICE THEREOF FOR A SOLAR POWER SYSTEM

(75) Inventors: Hung-Liang Chou, Kaohsiung (TW);
Wen-Jung Chiang, Kaohsiung (TW);
Chin-Chang Wu, Kaohsiung (TW);
Ya-Tsung Feng, Kaohsiung (TW);
Li-Hsiang Lai, Kaohsiung (TW)

(73) Assignee: UIS Abler Electronics Co., Ltd., Hsintien, Taipei Hsien (TW)

( * ) Notice: Subject to any disclaimer, the term of this patent is extended or adjusted under 35 U.S.C. 154(b) by 150 days.

(21) Appl. No.: 11/541,739

(22) Filed: Oct. 3, 2006

(65) Prior Publication Data

US 2007/0290668 A1   Dec. 20, 2007

(30) Foreign Application Priority Data

Jun. 16, 2006   (TW) .............................. 95121589 A

(51) Int. Cl.
*G05F 5/00* (2006.01)
*G05F 1/40* (2006.01)
*H02M 7/00* (2006.01)
(52) U.S. Cl. ........................ 323/299; 323/906; 363/101; 320/161

(58) Field of Classification Search ................. 320/149, 320/161, 162; 323/222, 299, 300, 351, 906; 363/95, 101
See application file for complete search history.

(56) References Cited

U.S. PATENT DOCUMENTS

| | | | | |
|---|---|---|---|---|
| 4,494,180 | A | * | 1/1985 | Streater et al. ................ 363/37 |
| 4,794,272 | A | * | 12/1988 | Bavaro et al. ................. 307/66 |
| 5,327,071 | A | | 7/1994 | Frederick et al. |
| 5,493,204 | A | * | 2/1996 | Caldwell ..................... 323/299 |
| 5,932,994 | A | | 8/1999 | Jo et al. |
| 6,281,485 | B1 | | 8/2001 | Siri |
| 7,079,406 | B2 | | 7/2006 | Kurokami et al. |
| 7,091,707 | B2 | * | 8/2006 | Cutler ......................... 323/268 |
| 7,193,872 | B2 | * | 3/2007 | Siri ............................. 363/95 |

\* cited by examiner

*Primary Examiner*—Gary L Laxton
(74) *Attorney, Agent, or Firm*—Bacon & Thomas, PLLC

(57) ABSTRACT

A maximum power point tracking method, applied to a tracking device, employs a DC/DC converter connecting with a solar cell array, and including a controller actuating the DC/DC converter to perform an active resistance characteristic; a maximum power point tracking circuit adjusting the active resistance of the DC/DC converter; monitoring a change of an output power of the solar cell array in determining a direction for adjusting the active resistance of the DC/DC converter; and the maximum power point tracking circuit repeatedly adjusting the active resistance of the DC/DC converter. If the change of the output power of the solar cell array is positive, the active resistance of the DC/DC converter is adjusted in the same direction; but, conversely, if the change of the output power of the solar cell array is negative, the active resistance of the DC/DC converter is adjusted in an opposite direction.

18 Claims, 3 Drawing Sheets

MAXIUM POWER POINT TRACKING METHOD AND TRACKING DEVICE THEREOF FOR A SOLAR POWER SYSTEM

BACKGROUND OF THE INVENTION

1. Field of the Invention

The present invention relates to a maximum power point tracking method and a maximum power point tracking device for a solar power system. Particularly, the present invention relates to the maximum power point tracking method actuating a DC/DC converter to perform an active resistance characteristic so as to supply power to a DC/AC inverter or a DC load. More particularly, the present invention relates to the maximum power point tracking method that adjusts the DC/DC converter for changing its active resistance, and monitors a change of output power of a solar cell array.

2. Description of the Related Art

In solar power applications, a most significant subject focused today is associated with a technology of maximum power point tracking in addition to other major technologies which have been developed. Presently, a most common technology for maximum power point tracking is a perturbation and observation method. A conventional perturbation and observation method for maximum power point tracking, described in U.S. Pat. No. 5,327,071, controls a DC/DC converter for tracking a maximum power point of a solar cell array. In maximum power point tracking operation, an output voltage of the solar cell array is initially varied. Secondly, an output power of the solar cell array is subsequently detected. Each new value of the detected output power compares with a previous value in determining a perturbation direction of the output voltage of the solar cell array. In this circumstance, the output voltage of the solar cell array is continuously varied in detecting the maximum power point. Once detected a position of the maximum power point, the output voltage of the solar cell array is continuously varied around this position of the maximum power point for repeatedly re-determining it.

Another conventional perturbation and observation method for maximum power point tracking, described in U.S. Pat. No. 5,932,994, also controls a DC/DC converter so as to further control output voltage of a solar cell array for tracking a maximum power point. In maximum power point tracking operation, a duty cycle of a power switch in the DC/DC converter is initially varied. An output voltage and an output current of the solar cell array are detected to calculate an output power thereof. Each new value of the calculated output power compares with a previous value in determining a direction of fluctuation of the duty cycle of the power switch. In this circumstance, the duty cycle of the power switch is continuously varied in detecting the maximum power point. Once detected a position of the maximum power point, the duty cycle of the power switch is continuously varied around this position of the maximum power point for repeatedly re-determining it.

As has been explained above, these conventional perturbation and observation methods require at least two signals of detected voltages or currents in detecting the maximum power point. However, there exist some problems with practicing these perturbation methods applied to detect the maximum power point. For example, the circuits of maximum power point tracking devices for use in practicing such perturbation and observation methods result in complication of structures, and increase the manufacturing costs. Hence, there is a need for improving these perturbation and observation methods and the maximum power point tracking devices applied thereto.

As is described in greater detail below, the present invention intends to provide a maximum power point tracking method and a maximum power point tracking device for a solar power system. A DC/DC converter connecting with a solar cell array is actuated to perform an active resistance characteristic for supplying power to a DC/AC inverter or a DC load. A maximum power point tracking circuit is further used to adjust the DC/DC converter for changing its active resistance, and to monitor a change of the solar cell array in output power. Accordingly, the maximum power point tracking method and the maximum power point tracking device are simplified, and manufacturing cost thereof is reduced.

SUMMARY OF THE INVENTION

The primary objective of this invention is to provide a maximum power point tracking method and a maximum power point tracking device for a solar power system. A DC/DC converter connecting with a solar cell array is actuated to perform an active resistance characteristic for supplying power to a DC/AC inverter or a DC load. A maximum power point tracking circuit is further used to adjust the DC/DC converter for changing its active resistance, and to monitor a change of the solar cell array in output power. Accordingly, the maximum power point tracking method and the maximum power point tracking device are simplified, and manufacturing cost thereof is reduced.

The secondary objective of this invention is to provide the maximum power point tracking method for the solar power system using a maximum power point tracking circuit. The DC/DC converter is actuated to perform an active resistance characteristic, and the maximum power point tracking circuit is used to adjust the active resistance in a direction, and to monitor a change of the solar cell array in output power. If a change of the output power of the solar cell array is positive, the maximum power point tracking circuit continuously adjusts the active resistance so that the active resistance of the DC/DC converter can be successively changed in the same direction. But, conversely, if a change of the output power of the solar cell array is negative, the maximum power point tracking circuit reversely adjusts the active resistance so that the active resistance of the DC/DC converter can be changed in opposite direction. To track the maximum power point of the solar cell array, the maximum power point tracking circuit repeatedly adjusts the DC/DC converter for changing its active resistance. In this manner, the active resistance of the DC/DC converter is continuously varied toward an operation point as well as the maximum power point.

The maximum power point tracking device in accordance with an aspect of the present invention includes: a solar cell array for supplying power; a DC/DC converter connecting with the solar cell array, the DC/DC converter including an input capacitor, an inductor, a power electronic switch, a diode, an output capacitor and a controller, the controller generating a driving signal by feeding forward an inductor current which can control turning on or off the power electronic switch of the DC/DC converter such that the controller can actuate the DC/DC converter to perform an active resistance characteristic, and to transfer energies of the DC/DC converter to a DC/AC inverter or a DC load; a maximum power point tracking circuit connecting with the controller of the DC/DC converter, and outputting an active resistance control signal to adjust the DC/DC converter for changing its active resistance; monitoring a change of the output power of the solar cell array. The output power of the solar cell array is obtained from the result of the square of the inductor current of the DC/DC converter multiplied by the active resistance control signal. If a change of the output power of the solar cell array is positive, the active resistance control signal of the maximum power point tracking circuit is continuously adjusted in the same direction. But, conversely, if a change of the output power of the solar cell array is negative, the active resistance control signal of the maximum power-point tracking circuit is adjusted in opposite direction. To track the maximum power point of the solar cell array, the maximum power point tracking circuit repeatedly adjusts the DC/DC converter for changing its active resistance. In this manner, the active resistance control signal of the maximum power point tracking circuit is continuously varied toward an operation point of the maximum power point.

The maximum power point tracking method in accordance with a separate aspect of the present invention includes the step of: connecting a DC/DC converter with a solar cell array, and a controller actuating the DC/DC converter to perform an active resistance characteristic; a maximum power point tracking circuit adjusting the active resistance of the DC/DC converter; monitoring a change of an output power of the solar cell array in determining a direction for adjusting the active resistance of the DC/DC converter; and the maximum power point tracking circuit repeatedly adjusting the active resistance of the DC/DC converter.

In a further separate aspect, if the change of the output power of the solar cell array is positive, the active resistance of the DC/DC converter is adjusted in the same direction; but, conversely, if the change of the output power of the solar cell array is negative, the active resistance of the DC/DC converter is adjusted in an opposite direction.

In a yet further separate aspect, only an inductor current signal is required to be detected and calculated for carrying out a process for tracking the maximum power point of the solar cell array.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
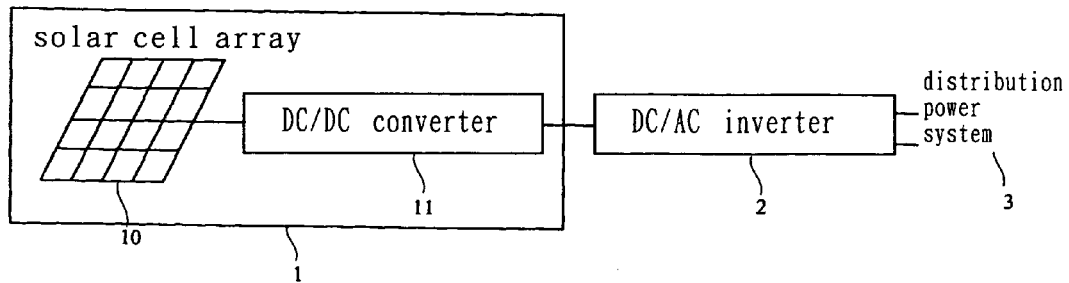
FIG. 1 is a schematic view illustrating a solar power system having a maximum power point tracking device in accordance with a first embodiment of the present invention.

Turning now to FIG. 1, a schematic view of a solar power system in accordance with a first embodiment of the present invention is illustrated. Referring to FIG. 1, a solar power system 1 includes a solar cell array 10 and a DC/DC converter 11. The solar power system 1 connects with a DC/AC inverter 2 such that a DC power generated from the solar power system 1 can be sent to the DC/AC inverter 2 and converted into AC power to supply to a distribution power system 3. An output DC voltage of the DC/DC converter 11 controlled by the DC/AC inverter 2 can be constant or varied in response to the changes of the AC voltage of the distribution power system 3.

Figure 2:
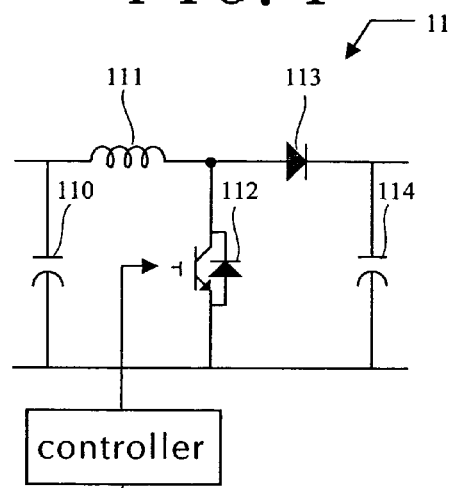
FIG. 2 is a schematic circuitry illustrating a DC/DC converter applied in the maximum power point tracing device in accordance with the first embodiment of the present invention, as depicted in FIG. 1.

Turning now to FIG. 2, a schematic circuitry of the DC/DC converter applied in the maximum power point tracking device for the solar power system in accordance with a first embodiment of the present invention is illustrated. By referring to FIG. 2, the DC/DC converter 11 includes an input capacitor 110, an inductor 111, a power electronic switch 112, a diode 113, an output capacitor 114 and a controller 115.

Still referring to FIGS. 1 and 2, the input capacitor 110 is used to stabilize a voltage of the solar cell array 10 while the controller 115 is used to generate a control signal to turn on or off the power electronic switch 112. If the power electronic switch 112 is turned on, the inductor 111 can be charged by energy generated by the solar cell array 10. Conversely, if the power electronic switch 112 is turned off, energy stored in the inductor 111 can be transferred to the output capacitor 114 via the diode 113. Accordingly, the electric power of the solar cell array 10 can be converted into a higher voltage of the DC power.

Figure 3:
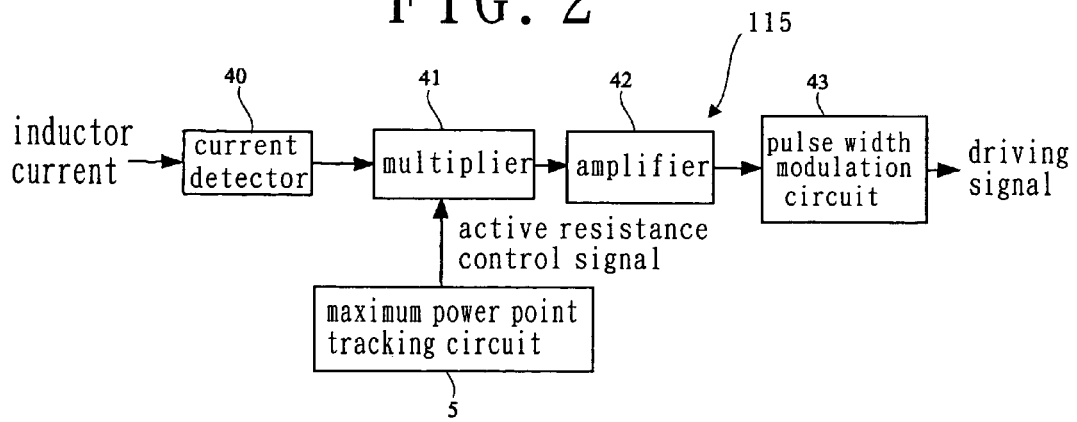
FIG. 3 is a block diagram illustrating a controller of the DC/DC converter applied in the maximum power point tracking device in accordance with the first embodiment of the present invention, as depicted in FIG. 2.

Turning now to FIG. 3, a block diagram of the controller 115 of the DC/DC converter applied in the maximum power point tracking device in accordance with the first embodiment of the present invention is illustrated. With reference to FIG. 3, the controller 115 includes a current detector 40, a multiplier 41, an amplifier 42 and a pulse width modulation circuit 43. Furthermore, the output of the maximum power point tracking circuit 5 is an input of the multiplier 41.

Referring to FIGS. 2 and 3, the current detector 40 can detect a current of the inductor 111 provided in the DC/DC converter 11. An output of the current detector 40 and an active resistance control signal of the maximum power point tracking circuit 5 are sent to the multiplier 41 and multiplied therein. Subsequently, the result of the multiplier 41 is sent to the amplifier 42 which can amplify it. Subsequently, the result of the amplifier 42 is further sent to the pulse width modulation circuit 43 to perform a modulation signal so as to generate a driving signal. Consequently, the driving signal generated by the pulse width modulation circuit 43 can control the power electronic switch 112 to turn on or off.

Still referring to FIG. 2, when the power electronic switch 112 is turned on, a voltage across two terminals of the power electronic switch 112 approximates zero. But, conversely, when the power electronic switch 112 is turned off, a voltage across the two terminals of the power electronic switch 112 equals the output voltage of the DC/DC converter 11 since the diode 113 is conducted. A square wave appears across the two terminals of the power electronic switch 112 if turning on or off the power electronic switch 112 is alternatively controlled. In this manner, the voltage across the two terminals of the power electronic switch 112 is alternatively changed between zero and the output voltage of the DC/DC converter 11. When the current of the inductor 111 is continuously conducted, an average voltage across the two terminals of the power electronic switch 112 is proportional to the time duration for turning off the power electronic switch 112.

Referring again to FIG. 3, the modulation signal of the amplifier 42 for the pulse width modulation circuit 43 is proportional to a current signal of the inductor 111. The modulation signal is sent to the pulse width modulation circuit 43 and compared with a high-frequency triangular wave. When the modulation signal is higher than the high-frequency triangular wave, the controller 115 controls the power electronic switch 112 to turn off. But, conversely, when the modulation signal is lower than the high-frequency triangular wave, the controller 115 controls the power electronic switch 112 to turn on. In this circumstance, the time duration for turning off the power electronic switch 112 is proportional to the modulation signal such that the average voltage across the two terminals of the power electronic switch 112 is proportional to the current passing through the inductor 111, namely, the DC/DC converter 11 can generate a voltage which is proportional to its input current. Accordingly, the DC/DC converter 11 is controlled to perform an active resistance characteristic such that the DC/DC converter 11 can be regarded as an active resistor. In operation, when the current of the inductor 111 is continuously conducted, the value of active resistor is proportional to the active resistance control signal output from the maximum power point tracking circuit 5.

Figure 4:
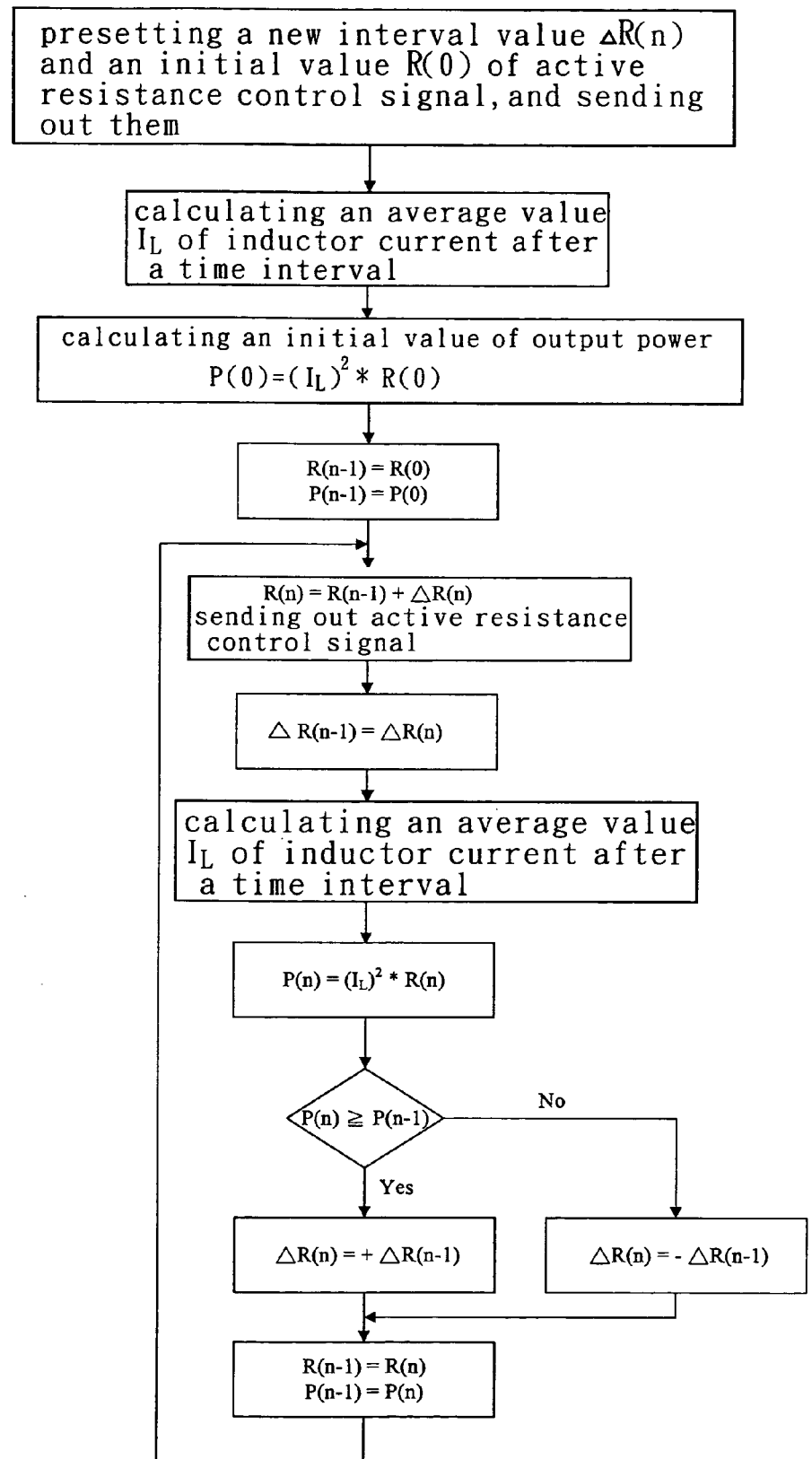
FIG. 4 is a flow chart illustrating a maximum power point tracking method for a maximum power point tracking circuit applied in the solar power system in accordance with the first embodiment of the present invention.

Turning now to FIG. 4, a flow chart of a maximum power point tracking method for the maximum power point tracking circuit applied in the solar power system in accordance with the first embodiment of the present invention is illustrated. Referring to FIGS. 2 through 4, firstly, an new interval value (identified as "$\Delta R(n)$") and an initial value (identified as "$R(0)$") of the active resistance control signal are preset. The initial value $R(0)$ of the active resistance control signal is sent to the controller 115 of the DC/DC converter 11 to act as an active resistance control signal. Subsequently, after a time interval, an average current (identified as "$I_L$") of the inductor 111 is calculated. The square of the average current $I_L$ of the inductor 111 and the initial value $R(0)$ of the active resistance control signal are multiplied for obtaining an initial value (identified as "$P(0)$") of output power of the solar cell array 10. To measure output power of the solar cell array, there is provided the time interval for stabilizing current and voltage of the DC/DC converter 11 after the active resistance control signal is sent out.

Still referring to FIGS. 2 through 4, the initial value $R(0)$ of the active resistance control signal is regarded as an old (previous) value $R(n-1)$ while the initial value $P(0)$ of output power of the solar cell array 10 is regarded as an old (previous) value $P(n-1)$. In addition to this, a new value $R(n)$ of the active resistance control signal is obtained by adding the old value $R(n-1)$ of the active resistance control signal and a new interval value $\Delta R(n)$, and is sent to controller 115 of the DC/DC converter 11 to act as an active resistance control signal. In this circumstance, the new interval value $\Delta R(n)$ has replaced the old interval value $\Delta R(n-1)$. Subsequently, after a time interval, an average current $I_L$ of the inductor 111 is calculated, and the square of the average current $I_L$ of the inductor 111 and the new value $R(n)$ of the active resistance control signal are multiplied for obtaining a new value (identified as "$P(n)$") of output power of the solar cell array 10.

To track the maximum power point, the new value $P(n)$ of output power of the solar cell array 10 is compared with the old value $P(n-1)$, with continued reference to FIGS. 2 through 4. If the new value $P(n)$ of output power of the solar cell array 10 is greater than the old value $P(n-1)$, the new interval value $\Delta R(n)$ of the active resistance control signal is not changed, and is identical with the old (previous) interval value $\Delta R(n-1)$ (namely, $\Delta R(n)=\Delta R(n-1)$). But, conversely, if the new value $P(n)$ of output power of the solar cell array 10 is less than the old value $P(n-1)$, the new interval value $\Delta R(n)$ of the active resistance control signal is changed to reverse direction, and is opposite to the old (previous) interval value $\Delta R(n-1)$ (namely, $\Delta R(n)=-\Delta R(n-1)$). Finally, the new value $P(n)$ of output power of the solar cell array 10 has replaced the old value $P(n-1)$, and the new value $R(n)$ of the active resistance control signal has also replaced the old value $R(n-1)$ at the same time.

Subsequently, a new series of steps is repeated and circulated continuously by the previous steps until a maximum power point of output power is tracked. Once detected an operation point for the maximum power point, the maximum power point tracking circuit 5 controls the output power of the solar cell array 10 continuously perturbing around the operation point for the maximum power point. In a preferred embodiment, the interval value "$\Delta R$" of the active resistance control signal is constant or variable.

In an alternative embodiment, when the interval values "$\Delta R$" of the active resistance control signal are variable values, each of which is proportional to a difference between the new value $P(n)$ and the old value $P(n-1)$ of output power of the solar cell array 10. If a difference between the new value $P(n)$ and the old value $P(n-1)$ of output power of the solar cell array 10 becomes greater, it represents a position having a perturbation point far away from the exact position of the maximum power point of output power that enlarges the interval values "$\Delta R$" of the active resistance control signal. Accordingly, it would be advantageous that the processing time for tracking the maximum power point is speeded up. But, conversely, if a difference between the new value $P(n)$ and the old value $P(n-1)$ of output power of the solar cell array 10 becomes smaller, it represents a position having a perturbation point approaching the exact position of the maximum power point of output power in such a way as to reduce interval values "$\Delta R$" of the active resistance control signal. Accordingly, it would be advantageous that the perturbation of output power of the solar cell array 10 around the exact maximum power point is small, and the power loss is reduced.

Referring back to FIGS. 3 and 4, the maximum power point tracking method and the maximum power point tracking circuit in accordance with the present invention only requires detecting the current of the inductor 111 of the DC/DC converter 11 for tracking the maximum power point. Consequently, it would be advantageous that this method and this circuit can simplify the entire structure, and reduce manufacturing cost. Conversely, the conventional perturbation methods require at least two signals of detected voltages or currents in detecting the maximum power point. Inevitably, such a conventional method results in a complicated structure and an increase of manufacturing cost.

Figure 5:
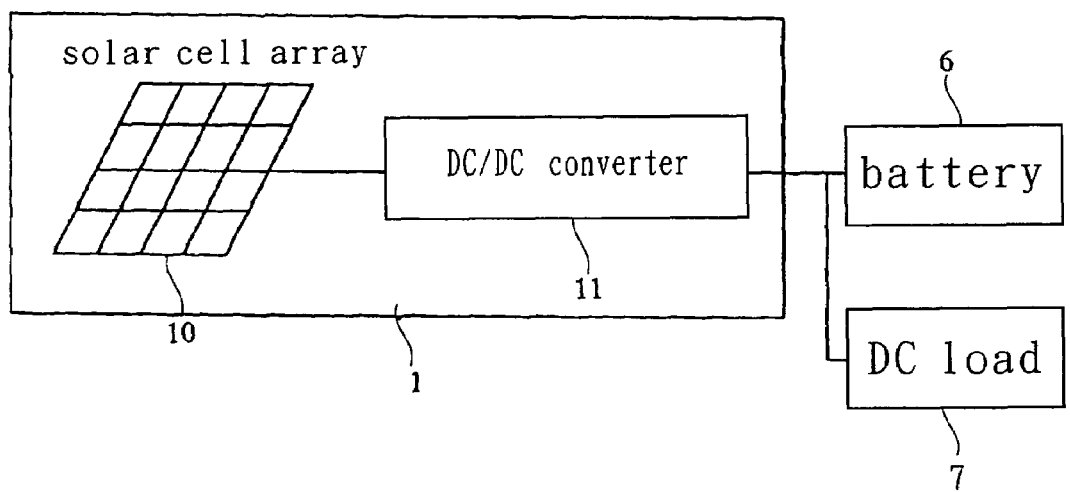
FIG. 5 is a schematic view illustrating a solar power system having a maximum power point tracking device in accordance with a second embodiment of the present invention.

Turning now to FIG. 5, a schematic view of a solar power system having a maximum power point tracking device in accordance with a second embodiment of the present invention is illustrated. Referring to FIG. 5, the solar power system 1 includes a solar cell array 10 and a DC/DC converter 11. The DC/DC converter 11 further includes a maximum power point tracking circuit 5. In the second embodiment, the solar power system 1 supplies DC power to a battery 6 and/or a DC load 7. The operational steps for maximum power point tracking method in accordance with the second embodiment of the present invention has similar to those of the first embodiment and detailed descriptions may be therefore omitted.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A maximum power point tracking method for a solar power system, comprising:
   connecting a DC/DC converter with a solar cell array, and including a controller actuating the DC/DC converter to perform an active resistance characteristic;
   a maximum power point tracking circuit adjusting the active resistance of the DC/DC converter;
   monitoring a change of an output power of the solar cell array in determining a direction for adjusting the active resistance of the DC/DC converter; and
   the maximum power point tracking circuit repeatedly adjusting the active resistance of the DC/DC converter to track a maximum power point of the output power of the solar cell array;
   wherein if the change of the output power of the solar cell array is positive, the active resistance of the DC/DC converter is adjusted in the same direction; but, conversely, if the change of the output power of the solar cell array is negative, the active resistance of the DC/DC converter is adjusted in an opposite direction.

2. The maximum power point tracking method for the solar power system as defined in claim 1, wherein the maximum power point tracking circuit practicing the steps of:
   step A, providing an initial value and a new interval value of an active resistance control signal to the DC/DC converter so that a voltage and a current of the DC/DC converter being stabilized after a time interval;
   step B, calculating an initial value of the output power of the solar cell array;
   step C, regarding the initial value of the active resistance control signal as an old value, and regarding the initial value of the output power of the solar cell array as an old value;
   step D, adding the old value and the new interval value of the active resistance control signal to obtain a new value of the active resistance control signal and regarding the new interval value of the active resistance control signal as an old interval value, after the time interval, the voltage and the current of the DC/DC converter being stabilized;
   step E, calculating a new value of the output power of the solar cell array;
   step F, comparing the new value of the output power of the solar cell array with the old value; step G, if the new value of the output power of the solar cell array being greater than the old value, the new interval value of the active resistance control signal being identical with the old interval value; if the new value of the output power of the solar cell array being smaller than the old value, the new interval value of the active resistance control signal being opposite to the old interval value;
   step H, the new value of the active resistance control signal replacing the old value, and the new value of the output power of the solar cell array replacing the old value;
   step I, repeating the steps D through H.

3. The maximum power point tracking method for the solar power system as defined in claim 1, wherein the DC/DC converter includes an input capacitor, an inductor, a power electronic switch, a diode and an output capacitor.

4. The maximum power point tracking method for the solar power system as defined in claim 1, wherein the controller includes a current detector, a multiplier, an amplifier and a pulse width modulation circuit, the multiplier connects with the maximum power point tracking circuit.

5. The maximum power point tracking method for the solar power system as defined in claim 1, wherein the controller outputs a driving signal for turning on or off a power electronic switch of the DC/DC converter.

6. The maximum power point tracking method for the solar power system as defined in claim 3, wherein the controller detects a current of the inductor, and generates a pulse width modulation signal with an average value proportional to a product of the current of the inductor and the active resistance control signal so that the DC/DC converter is acted as an active resistor.

7. The maximum power point tracking method for the solar power system as defined in claim 1, wherein the output power of the solar cell array is obtained from a square value of an average current of an inductor multiplied by the active resistance control signal.

8. The maximum power point tracking method for the solar power system as defined in claim 1, wherein the DC/DC converter connects with a DC/AC inverter.

9. The maximum power point tracking method for the solar power system as defined in claim 1, wherein the DC/DC converter connects with at least one of a battery and a DC load.

10. A maximum power point tracking device for a solar power system, comprising:
    a DC/DC converter connecting with a solar cell array which supplies an output power such that the solar cell array supplies the output power through the DC/DC converter which is acted as an active resistance characteristic; and
    a maximum power point tracking circuit connecting with an controller of the DC/DC converter, the maximum power point tracking circuit outputting an active resistance control signal to the controller of the DC/DC converter;
    wherein the maximum power point tracking circuit adjusting the active resistance of the DC/DC converter so as to detect a maximum power point of the output power of the solar cell array, and to continuously perturb the output power of the solar cell array around an operation point corresponding to the maximum power point.

11. The maximum power point tracking device for the solar power system as defined in claim 10, wherein the solar power system connects with a DC/AC inverter such that a DC power supplied from the solar power system is converted into an AC power for supplying to a distribution power system.

12. The maximum power point tracking device for the solar power system as defined in claim 10, wherein the solar power system connects with at least one of a battery and a DC load.

13. The maximum power point tracking device for the solar power system as defined in claim 10, wherein the DC/DC converter further includes an input capacitor, an inductor, a power electronic switch, a diode and an output capacitor.

14. The maximum power point tracking device for the solar power system as defined in claim 13, wherein the controller of the DC/DC converter includes a current detector, a multiplier, an amplifier and a pulse width modulation circuit, and wherein the multiplier connects with the maximum power point tracking circuit.

15. The maximum power point tracking device for the solar power system as defined in claim 14, wherein the controller of the DC/DC converter outputs a driving signal for turning on or off the power electronic switch of the DC/DC converter.

16. The maximum power point tracking device for the solar power system as defined in claim 14, wherein the current detector detects a current of the inductor of the DC/DC converter.

17. The maximum power point tracking device for the solar power system as defined in claim 14, wherein the current of the inductor of the DC/DC converter and the active resistance control signal of the maximum power point tracking circuit are multiplied and modulated to generate the driving signal for turning on or off the power electronic switch of the DC/DC converter so that the DC/DC converter is acted as an active resistor.

18. The maximum power point tracking device for the solar power system as defined in claim 10, wherein the output power of the solar cell array is obtained from a square value of an average current of an inductor multiplied by the active resistance control signal.

* * * * *

UNITED STATES PATENT AND TRADEMARK OFFICE
CERTIFICATE OF CORRECTION

PATENT NO. : 7,394,237 B2
APPLICATION NO. : 11/541739
DATED : July 1, 2008
INVENTOR(S) : Hung-Liang Chou It is certified that error appears in the above-identified patent and that said Letters Patent is hereby corrected as shown below:

Title Page, Item (73)
Please change the Assignee listed on the first page of the above-identified patent from "UIS Abler Electronics Co., Ltd." to --Ablerex Electronics Co., Ltd.--

Signed and Sealed this

Fourteenth Day of September, 2010

David J. Kappos
*Director of the United States Patent and Trademark Office*